US012576717B2

(12) United States Patent (10) Patent No.: US 12,576,717 B2
Yoshizawa (45) Date of Patent: Mar. 17, 2026

(54) DRIVING ASSISTANCE APPARATUS

(71) Applicant: JVCKENWOOD Corporation, Yokohama (JP)

(72) Inventor: Koichi Yoshizawa, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 0 days.

(21) Appl. No.: 18/830,317

(22) Filed: Sep. 10, 2024

(65) Prior Publication Data

US 2025/0296441 A1 Sep. 25, 2025

(30) Foreign Application Priority Data

Mar. 22, 2024 (JP) ................................. 2024-046930

(51) Int. Cl.
*B60K 35/50* (2024.01)
*B60H 1/00* (2006.01)
*B60R 11/04* (2006.01)

(52) U.S. Cl.
CPC ......... *B60K 35/50* (2024.01); *B60H 1/00478* (2013.01); *B60R 11/04* (2013.01)

(58) Field of Classification Search
CPC .......... H04N 7/18; H04N 7/181; B60K 35/50; B60H 1/00478; B60R 11/04
USPC ....................................................... 348/148
See application file for complete search history.

(56) References Cited

U.S. PATENT DOCUMENTS

| | | | | |
|---|---|---|---|---|
| 10,562,582 B2 * | 2/2020 | Mizuno | ................... | H04N 23/55 |
| 11,696,005 B2 * | 7/2023 | Shimizu | ................... | B61K 9/08 |
| | | | | 348/148 |
| 12,108,575 B1 * | 10/2024 | Hernandez Franco | ...................... | |
| | | | | H05K 7/20409 |
| 2016/0129962 A1 * | 5/2016 | Langevin | ............... | B62J 50/225 |
| | | | | 386/226 |
| 2024/0300612 A1 * | 9/2024 | Iwamoto | ................... | B62J 45/00 |

FOREIGN PATENT DOCUMENTS

JP 3237204 U 4/2022

* cited by examiner

*Primary Examiner* — Trang U Tran
(74) *Attorney, Agent, or Firm* — PROCOPIO, CORY, HARGREAVES & SAVITCH LLP

(57) ABSTRACT

A driving assistance apparatus of the present embodiment is a driving assistance apparatus to be attached to a handlebar of a mobile body, the driving assistance apparatus including: a housing unit configured to hold a mobile information terminal; and a drive recorder unit configured to record surroundings of a driver of the mobile body, the drive recorder unit being provided on a back side of the housing unit when seen from a driver of the mobile body, with a vacant space portion interposed therebetween, in which heat from the drive recorder unit is dissipated outside from the vacant space portion.

5 Claims, 7 Drawing Sheets

TRAVEL DIRECTION OF MOBILE BODY

TRAVEL DIRECTION OF MOBILE BODY

TRAVEL DIRECTION OF MOBILE BODY

D1

TRAVEL DIRECTION OF MOBILE BODY

DR1

DR2

DRIVING ASSISTANCE APPARATUS

CROSS REFERENCE TO RELATED APPLICATION

This application is based upon and claims the benefit of priority from Japanese patent application No. 2024-046930, filed on Mar. 22, 2024, the disclosure of which is incorporated herein in its entirety by reference.

BACKGROUND

The present disclosure relates to a driving assistance apparatus.

Japanese Utility Model No. 3237204 discloses a motorcycle-attachable mobile phone holder in which a mobile phone and a dashboard camera are integrally arranged.

SUMMARY

In the mobile phone holder disclosed in Japanese Utility Model No. 3237204, since the mobile phone and the dashboard camera are very close to each other, there is a possibility that the mobile phone fails due to heat from the dashboard camera.

A driving assistance apparatus according to the present embodiment is a driving assistance apparatus to be attached to a handlebar of a mobile body, the driving assistance apparatus including:

a housing unit configured to hold a mobile information terminal; and a drive recorder unit configured to record surroundings of a driver of the mobile body, the drive recorder unit being provided on a back side of the housing unit when seen from a driver of the mobile body, with a vacant space portion interposed therebetween, in which heat from the drive recorder unit is dissipated outside from the vacant space portion.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

Figure 1:
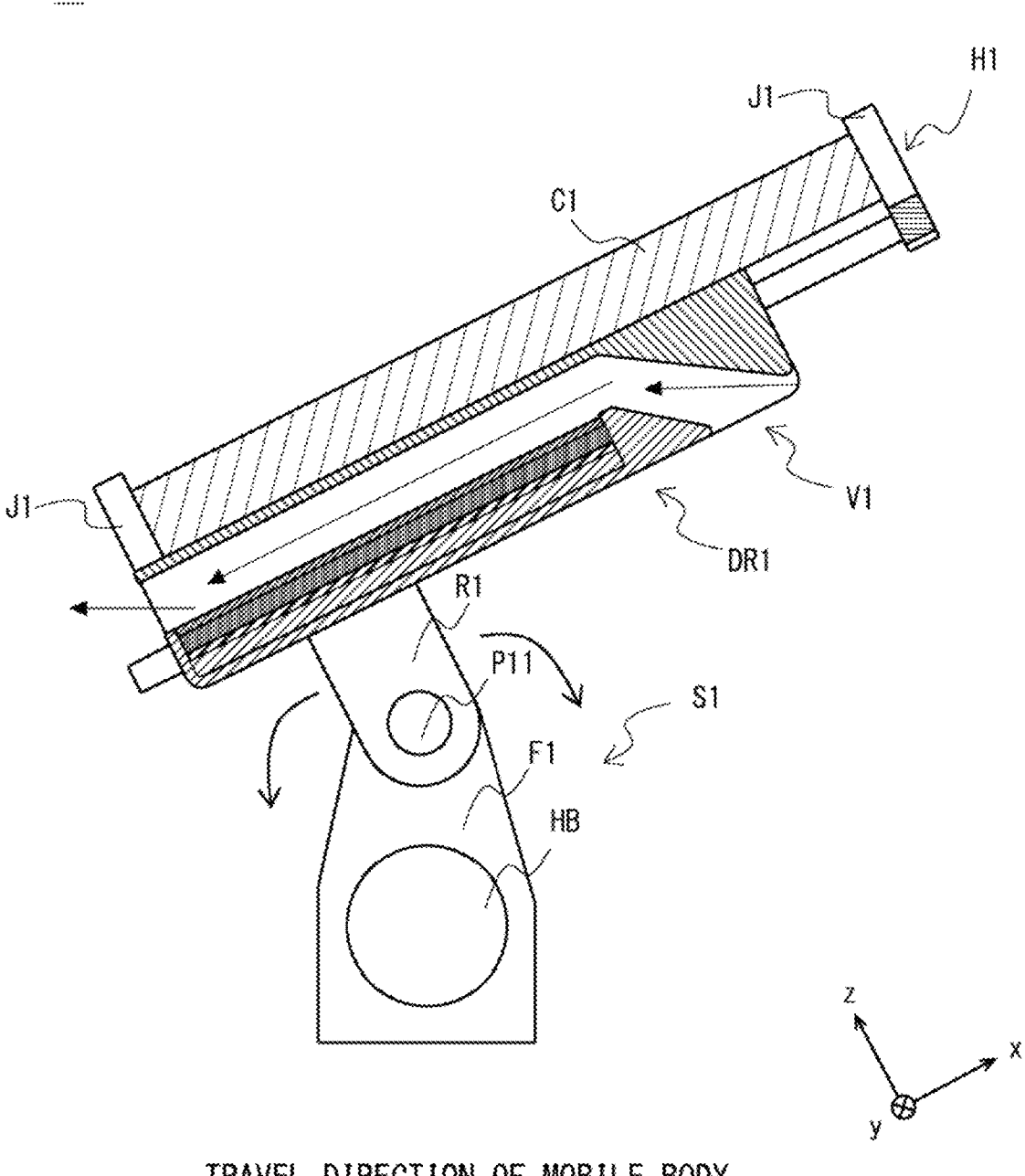
FIG. 1 is a sectional view of a driving assistance apparatus according to a first embodiment.

An embodiment of the present disclosure will be described below with reference to drawings. In the drawings, the same or corresponding components are given the same reference sign, and duplicate description will be omitted as necessary for clarification of description. Further, some reference signs are omitted in order to avoid the drawings from being complicated. It should be noted that each of the drawings below is schematic, and relationships between thicknesses and plane dimensions, a thickness ratio among layers, and the like are different from actual ones.

Therefore, specific thicknesses and dimensions should be determined in consideration of the description below. Further, it goes without saying that the drawings also include such a part that the dimension relationship and ratio are different among the drawings.

As a matter of course, the right-handed xyz Cartesian coordinates shown in each drawing are merely for convenience to describe positional relationships among components. In general, the positive z-axis indicates vertically upward, and the xy plane indicates a horizontal plane.

First Embodiment

Configuration of Driving Assistance Apparatus

Figure 2:
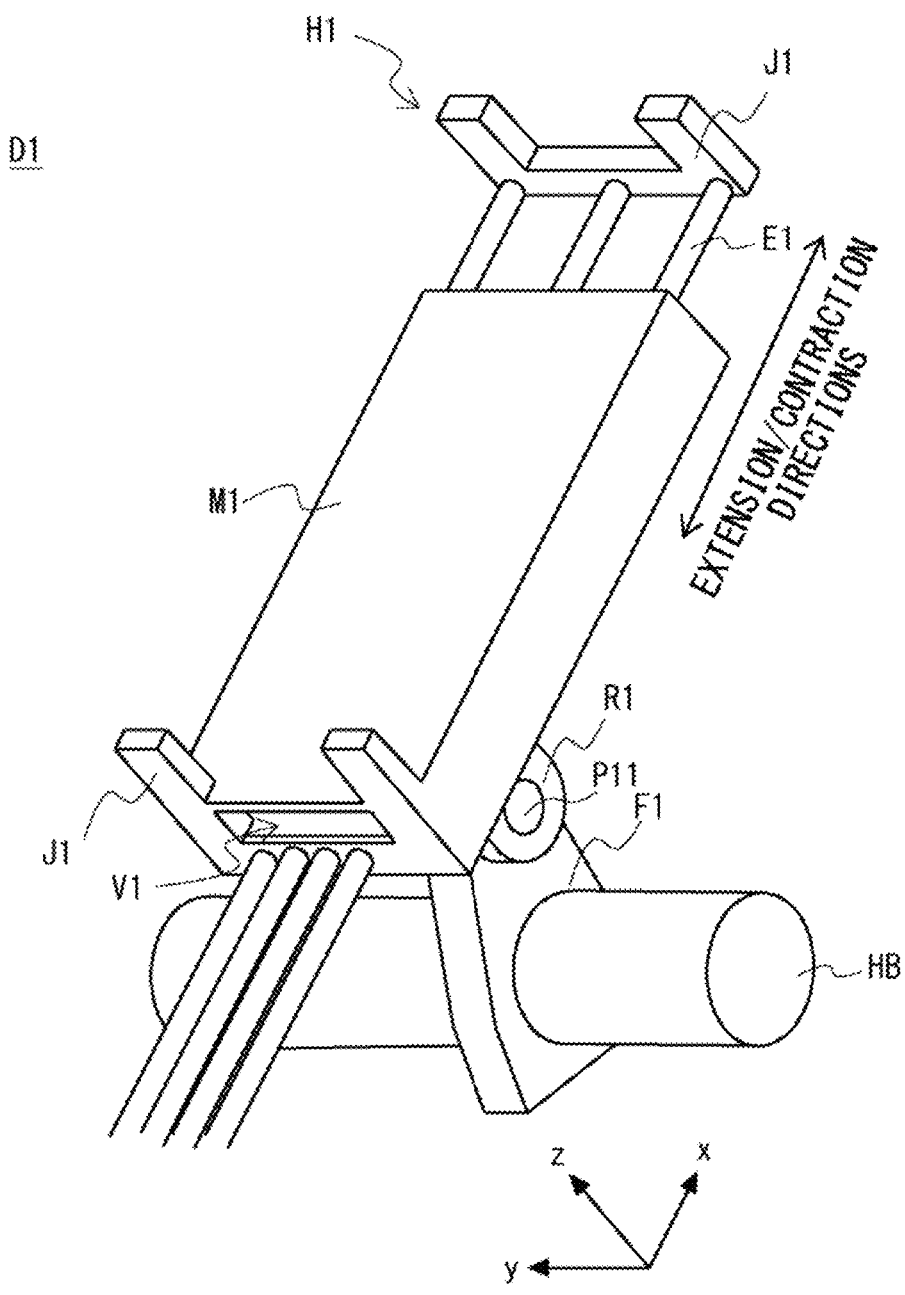
FIG. 2 is a perspective view of the driving assistance apparatus according to the first embodiment.
Figure 3:
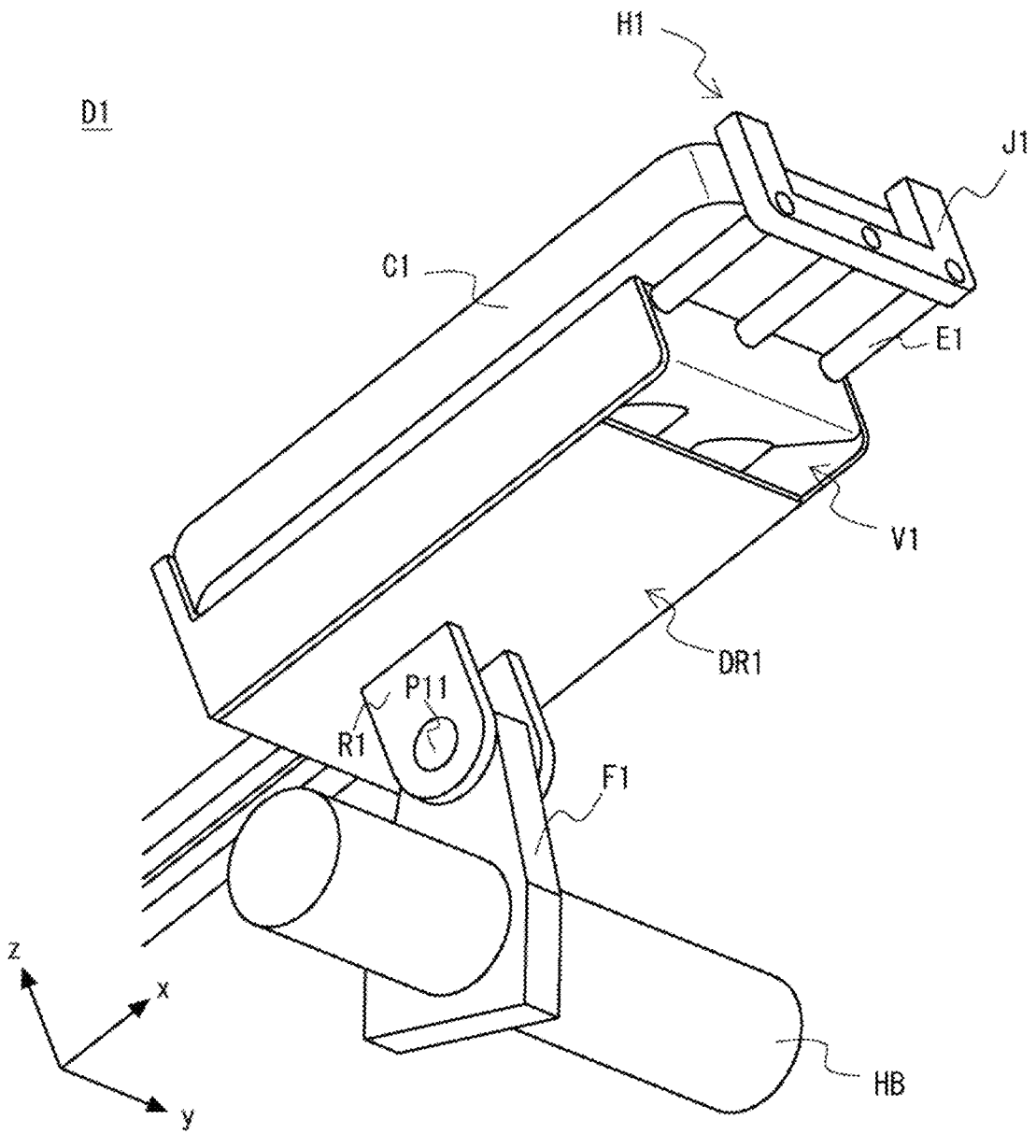
FIG. 3 is a perspective view of the driving assistance apparatus according to the first embodiment.

First, a configuration of a driving assistance apparatus D1 according to a first embodiment will be described with reference to FIGS. 1 to 3. FIG. 1 is a sectional view of the driving assistance apparatus D1 according to the first embodiment. FIGS. 2 and 3 are perspective views of the driving assistance apparatus D1 according to the first embodiment. FIGS. 1 and 3 are diagrams showing a state in which a mobile information terminal C1 is held by a housing unit H1. FIG. 2 is a diagram showing a state in which the mobile information terminal C1 is not held by the housing unit H1.

As shown in FIG. 1, the driving assistance apparatus D1 includes the housing unit H1, a drive recorder unit DR1, and a support unit S1.

Support Unit

First, the support unit S1 will be described. As shown in FIGS. 1 to 3, the support unit S1 is configured with a rotation mechanism unit R1 and a fixation unit F1. As shown in FIGS. 1 to 3, the fixation unit F1 is attached and fixed to a handlebar HB of a mobile body. The mobile body is a mobile body with a handlebar and is, for example, a two-wheeled vehicle or a micromobility. A driver can add a dashboard camera function to the mobile body by attaching the fixation unit F1 of the driving assistance apparatus D1 to the handlebar of the mobile body, and it is very convenient.

As shown in FIGS. 1 to 3, the rotation mechanism unit R1 is connected to the fixation unit F1 via a pinning portion P11. More specifically, as shown in FIG. 1, the rotation mechanism unit R1 has a structure of being rotatable around the pinning portion P1 in the direction of an arrow. By the rotation mechanism unit R1 rotating, an installation position of the mobile information terminal C1 held by the housing unit H1 to be described later can be adjusted. Alternatively, the pinning portion P11 may be modified to have a ball joint structure to seamlessly adjust the installation position of the mobile information terminal C1.

Housing Unit

Next, the housing unit H1 will be described. As shown in FIGS. 1 and 3, the housing unit H1 holds the mobile information terminal C1. As shown in FIG. 2, the housing unit H1 includes holding portions J1, an extendable portion E1, and a mounting portion M1.

As shown in FIG. 1, the mounting portion M1 (see FIG. 2) is provided with the mobile information terminal C1 mounted thereon. As shown in FIG. 1, the housing unit H1 holds the mobile information terminal C1 with four holding portions J1. In other words, the mounting portion M1 holds the bottom part of the mobile information terminal C1 to support the bottom part, and the holding portions J1 hold the corners of the mobile information terminal C1 to support the corners.

As shown in FIG. 2, the extendable portion E1 is a mechanism that is extendable and contractible in the directions of an arrow. As shown in FIG. 2, two holding portions J1 (on the positive x-axis direction side) slide in the directions of the arrow, accompanying extension or contraction of the extendable portion E1. Thereby, the housing unit H1 can hold the mobile information terminal C1 according to the size and shape of the mobile information terminal C1.

Though the four holding portions J1 are provided to support the corners of the mobile information terminal C1 in the example shown in FIGS. 1 to 3, the present disclosure is not limited thereto. Holding portions may be provided on the housing unit H1 to support a side (an xz plane) of the mobile information terminal C1.

Drive Recorder Unit

Next, the drive recorder unit DR1 will be described. The drive recorder unit DR1 records surroundings of the driver of the mobile body. As shown in FIGS. 1 to 3, the drive recorder unit DR1 is provided on the back side of the housing unit H1 (the negative z-axis direction side in FIG. 1). In general, the driver of the mobile body is located on the positive z-axis direction side of the mobile information terminal C1. Thereby, the drive recorder unit DR1 can be said to be on the back side of the housing unit H1 when seen from the driver of the mobile body. A heat dissipation mechanism of the drive recorder unit DR1 will be described later.

As shown in FIGS. 1 to 3, in the driving assistance apparatus D1, the drive recorder unit DR1 is provided on the back side of the housing unit H1 on which the mobile information terminal C1 is to be installed. In other words, in the driving assistance apparatus D1, the mobile information terminal C1 and the drive recorder unit DR1 are integrally arranged. Therefore, it is possible to install the driving assistance apparatus D1 on a space-restricted mobile body such as two-wheeled vehicle, saving space.

Vacant Space Portion

Next, a vacant space portion V1 will be described. As shown in FIGS. 1 to 3, the vacant space portion V1 is provided between the housing unit H1 and the drive recorder unit DR1. A distance from the bottom surface of the housing unit H1 to the top surface of the drive recorder unit DR1, that is, a width of the vacant space portion V1 is set to a predetermined width, for example, according to the installation space of the driving assistance apparatus D1 on the mobile body.

As shown in FIG. 1, the wind passes through the vacant space portion V1 in a direction opposite to the travel direction of the mobile body (the direction of arrows). As the travel speed of the mobile body increases, the flow rate and speed of the wind taken into the vacant space portion V1 increases. By increasing the width of the vacant space portion V1, the flow rate and speed of the wind taken into the vacant space portion V1 increases.

Driving Assistance Apparatus According to Comparison Example

Figure 4:
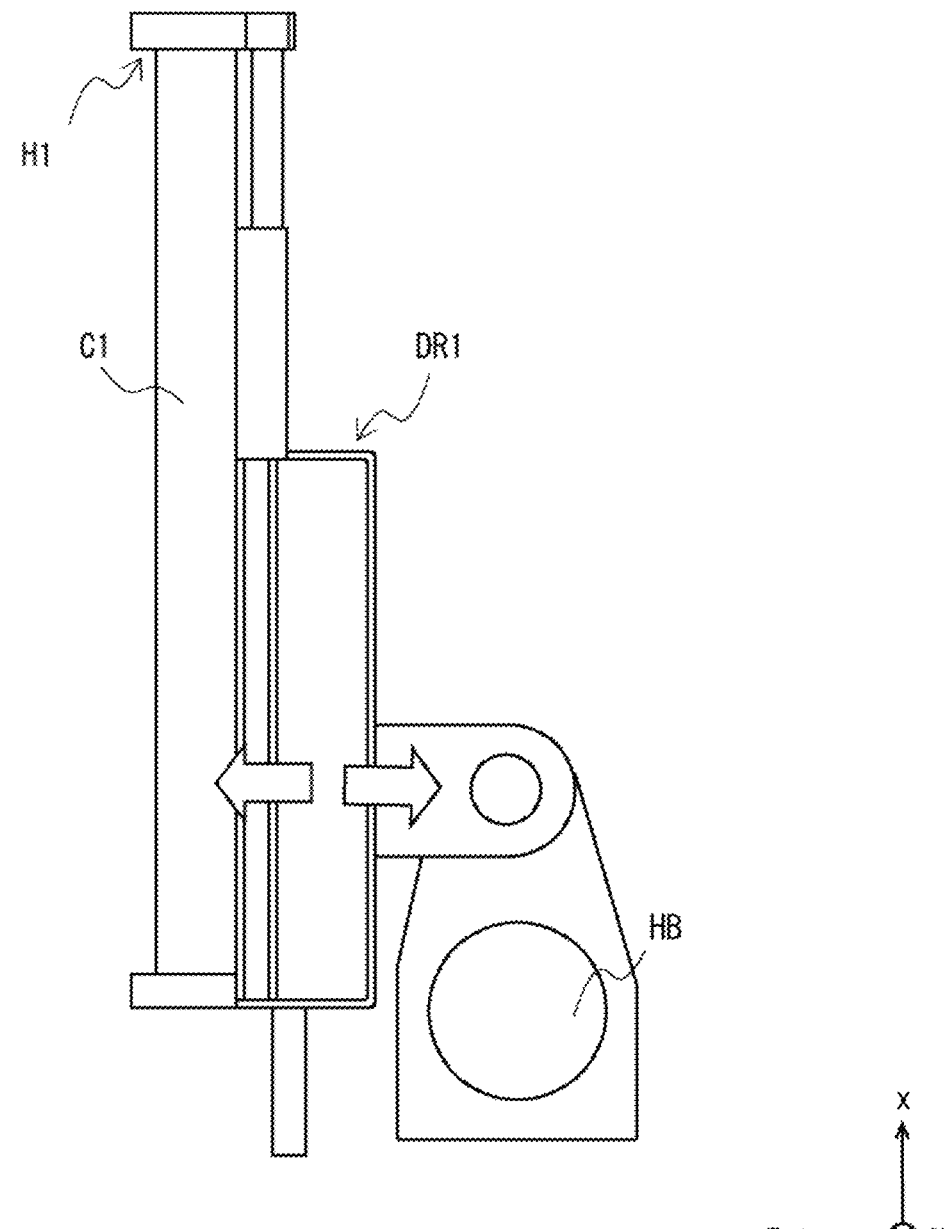
FIG. 4 is an xz plan view of a driving assistance apparatus according to a comparative example.

Here, a driving assistance apparatus according to a comparison example will be described with reference to FIG. 4. FIG. 4 is an xz plan view of the driving assistance apparatus according to the comparative example. In comparison with the driving assistance apparatus D1 shown in FIGS. 1 to 3, a driving assistance apparatus D2 shown in FIG. 4 is not provided with the vacant space portion V1. Except for that, the configuration is similar to that of the driving assistance apparatus D1 shown in FIGS. 1 to 3, and, therefore, description thereof will be omitted.

The drive recorder unit DR1 generates heat as it records the surroundings of the driver of the mobile body. Therefore, the drive recorder unit DR1 dissipates the heat outside. In other words, the drive recorder unit DR1 dissipates the heat in the z-axis direction (positive and negative directions) as indicated by arrows in FIG. 4.

Due to the heat (in the positive z-axis direction) transmitted from the drive recorder unit DR1 to the housing unit H1, the temperature of the housing unit H1 increases. Thereby, the temperature of the mobile information terminal C1 also increases. Therefore, there is a possibility that the mobile information terminal C1 fails due to the heat from the drive recorder unit DR1.

The mobile information terminal C1 also generates heat as it is used. Therefore, the mobile information terminal C1 also dissipates the heat outside. Due to the heat transmitted from the mobile information terminal C1 to the housing unit H1, the temperature of the housing unit H1 increases. Thereby, the temperature of the drive recorder unit DR1 also increases. Therefore, there is also a possibility that the drive recorder unit DR1 fails due to the heat from the mobile information terminal C1.

Heat Dissipation From Vacant Space Portion

In the driving assistance apparatus D1 according to the first embodiment, however, the vacant space portion V1 is provided between the housing unit H1 and the drive recorder unit DR1 as described before. Thereby, it is possible to prevent the heat from the drive recorder unit DR1 from being transmitted to the housing unit H1. Therefore, it is possible to prevent the mobile information terminal C1 from failing due to the heat from the drive recorder unit DR1. Further, it is also possible to prevent the heat from the mobile information terminal C1 from being transmitted to the drive recorder unit DR1.

In other words, by providing the vacant space portion V1 between the housing unit H1 and the drive recorder unit DR1, it is possible to prevent the heat from being transmitted from one of the mobile information terminal C1 and the drive recorder unit DR1 to the other. Therefore, in the driving assistance apparatus D1, it is possible to prevent failure of the drive recorder unit DR1 and the mobile information terminal C1 irrespective of travel of the mobile body.

Here, the driving assistance apparatus D1 is a driving assistance apparatus to be provided on a mobile body provided with a handlebar. A mobile body with a handlebar is not isolated from an external environment unlike an automobile. Therefore, the driving assistance apparatus D1 is directly affected by the external environment. The external environment is, for example, an environment related to the weather such as wind, rain, snow, temperature, and sunlight.

Due to the wind taken into the vacant space portion V1, it becomes easy for the driving assistance apparatus D1 to dissipate the heat from the drive recorder unit DR1 outside. Further, it is also possible for the driving assistance apparatus D1 to cool the drive recorder unit DR1 and the mobile information terminal C1 by the wind taken into the vacant space portion V1. The wind may be taken into the vacant space portion V1 by the wind blowing or by the mobile body traveling.

In the case of a strong wind, since the flow rate and speed of the wind taken into the vacant space portion V1 increases, the dissipation of heat to the outside and cooling described above increase more. Further, since the flow rate and speed of the wind taken into the vacant space portion V1 increases as the travel speed of the mobile body increases, the dissipation of heat to the outside and cooling described above increase more. Thus, the driving assistance apparatus D1 enhances the dissipation of heat to the outside by the drive recorder unit DR1 and the mobile information terminal C1 and cooling thereof, by utilizing being directly affected by the external environment.

In the driving assistance apparatus D1, when the mobile body is not used, the mounting portion M1 is exposed to sunlight because the mobile information terminal C1 is not attached. In the driving assistance apparatus D1, the drive recorder unit DR1 is provided on the back side of the housing unit H1 (the negative z-axis direction side in FIG. 1), that is, on the back side of the mounting portion M1 (see FIG. 2). Since the mounting portion M1 plays a role of a sunshade, it is possible to prevent the drive recorder unit DR1 from being directly exposed to sunlight. Therefore, it is possible to prevent increase in the temperature of the drive recorder unit DR1.

Heat Dissipation Mechanism of Drive Recorder Unit

Figure 5:
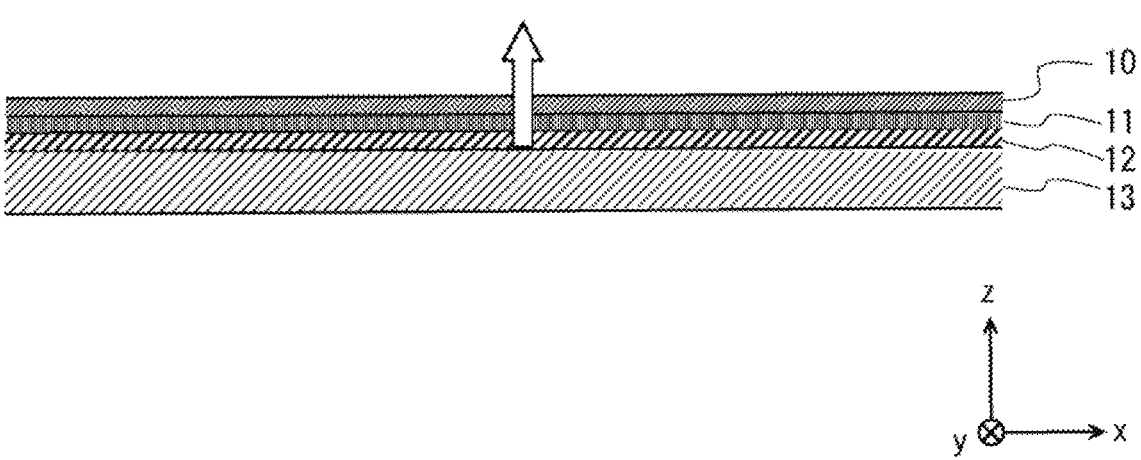
FIG. 5 shows sectional views of drive recorder units in the driving assistance apparatus according to the first embodiment and in the driving assistance apparatus according to the comparative example.
Figure 5:
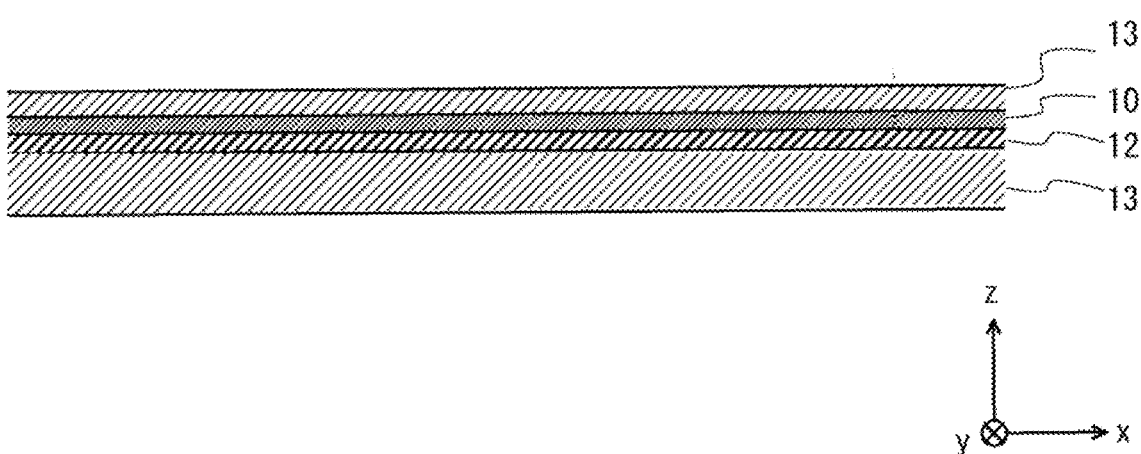

Here, heat dissipation mechanisms of drive recorder units will be described in detail with reference to FIG. 5. FIG. 5 shows sectional views of the drive recorder unit DR1 in the driving assistance apparatus D1 according to the first embodiment and a drive recorder unit DR2 in the driving assistance apparatus D2 according to the comparative example. The upper part of FIG. 5 shows a sectional view of the drive recorder unit DR1 of the driving assistance apparatus D1 according to the first embodiment. The lower part of FIG. 5 shows a sectional view of the drive recorder unit DR2 of the driving assistance apparatus D2 according to the comparative example. The sectional view in the upper part of FIG. 5 is an enlarged view of the sectional view of the drive recorder unit DR1 of FIG. 1.

First, the heat dissipation mechanism of the drive recorder unit DR2 of the driving assistance apparatus D2 according to the comparison example will be described with reference to the lower part of FIG. 5. As shown in the lower part of FIG. 5, the drive recorder unit DR2 is configured with casings 13, a heat dissipation body 10, and a circuit substrate 12.

As shown in the lower part of FIG. 5, the heat dissipation body 10 and the circuit substrate 12 are arranged between the casings 13. As shown in the lower part of FIG. 5, in the drive recorder unit DR2, the casing 13, the circuit substrate 12, the heat dissipation body 10, and the casing 13 are arranged in that order from the bottom part of the drive recorder unit DR2.

Next, the heat dissipation mechanism of the drive recorder unit DR1 of the driving assistance apparatus D1 according to the first embodiment will be described with reference to the upper part of FIG. 5. As shown in the upper part of FIG. 5, the drive recorder unit DR1 is configured with the casing 13, the heat dissipation body 10, a Peltier device 11, and the circuit substrate 12.

As shown in the upper part of FIG. 5, the heat dissipation body 10 is provided on the interface with the vacant space portion V1 (see FIGS. 1 to 3). The Peltier device 11 is provided between the heat dissipation body 10 and the circuit substrate 12. As shown in the upper part of FIG. 5, in the drive recorder unit DR1, the casing 13, the circuit substrate 12, the Peltier device 11, and the heat dissipation body 10 are arranged in that order from a bottom part of the drive recorder unit DR1.

The heat dissipation body 10 is made of metallic material, for example, aluminum. The heat dissipation body 10 dissipates the heat from the drive recorder unit DR1 into the vacant space portion V1 (see FIG. 1).

The Peltier device 11 absorbs heat from the circuit substrate 12 and dissipates the heat to the heat dissipation body 10. The Peltier device 11 has a heat dissipation surface and a heat absorption surface. The heat absorption surface of the Peltier device 11 is arranged on the circuit substrate 12 side. The heat dissipation surface of the Peltier device 11 is arranged on the heat dissipation body 10 side.

The heat from the circuit substrate 12 is absorbed by the heat absorption surface of the Peltier device 11. Then the heat absorbed by the heat absorption surface of the Peltier device 11 is dissipated upward (in the positive z-axis direction) by the heat dissipation surface of the Peltier device 11. The heat dissipated from the heat dissipation surface of the Peltier device 11 is dissipated by the heat dissipation body 10 into the vacant space portion V1 (see FIG. 1). In this way, the heat from the drive recorder unit DR1 is dissipated outside from the vacant space portion V1 (see FIG. 1). A configuration without the Peltier device 11 may be adopted.

Here, the heat dissipation mechanism of the drive recorder unit DR2 (in the lower part of FIG. 5) and the heat dissipation mechanism of the drive recorder unit DR1 (in the upper part of FIG. 5) will be compared. In the heat dissipation mechanism of the drive recorder unit DR1, the casing 13 on the vacant space portion V1 side is not provided in comparison with the heat dissipation mechanism of the drive recorder unit DR2. Thereby, in the drive recorder unit DR1, the thermal resistance of the casing 13 on the vacant space portion V1 side can be reduced, and it is easier to dissipate heat.

Here, in the heat dissipation mechanism of the drive recorder unit DR1 (in the upper part of FIG. 5), the wind may not be taken into the vacant space portion V1 when the mobile body is not traveling. The Peltier device 11, however, absorbs the heat from the circuit substrate 12 and dissipates the heat to the heat dissipation body 10 without being affected by whether the mobile body is traveling or not. Therefore, in the heat dissipation mechanism of the drive recorder unit DR1 (in the upper part of FIG. 5), the heat from the drive recorder unit DR1 is dissipated outside from the vacant space portion V1 (FIG. 1) even when the mobile body is not traveling.

Furthermore, in the heat dissipation mechanism of the drive recorder unit DR1 (in the upper part of FIG. 5), since the heat dissipation body 10 is provided on the interface of the vacant space portion V1 (see FIGS. 1 to 3), it is structured such that the driver cannot touch it. Therefore, the driving assistance apparatus D1 can dissipate the heat from the drive recorder unit DR1 while ensuring safety.

Intake of Wind

Figure 6:
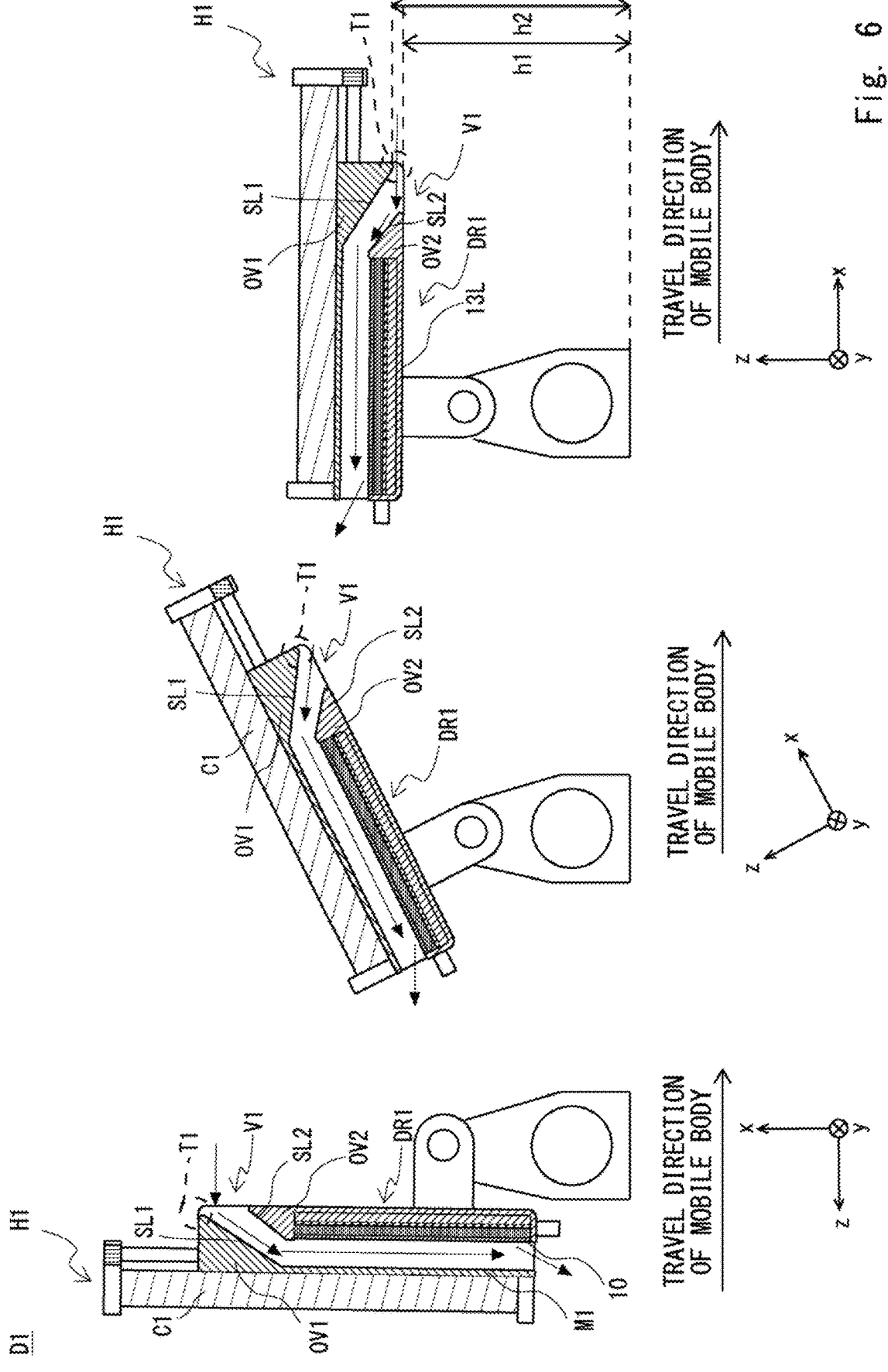
FIG. 6 shows sectional views of the driving assistance apparatus according to the first embodiment.

Next, intake of the wind by the driving assistance apparatus D1 will be described with reference to FIG. 6. FIG. 6 shows sectional views of the driving assistance apparatus D1 according to the first embodiment. FIG. 6 shows three states with different attachment positions (angles) of the mobile information terminal C1. The angle means an angle formed by a straight line parallel to the z axis and a straight line parallel to the travel direction of the mobile body. From the left side of FIG. 6, states in which attachment angles of the mobile information terminal C1 are 0 degrees, 45 degrees, and 90 degrees, respectively, are shown in that order. In FIG. 6, the travel direction of the mobile body is assumed to be a direction to the right side of the drawing in all the states.

As shown in FIG. 6, a projecting portion OV1 of the housing unit H1 is a part of the housing unit H1. The projecting portion OV1 projects to the drive recorder unit DR1 side. A bottom surface SL1 of the projecting portion OV1 has a negative slope in the xz plane.

A projection corresponding portion OV2 of the drive recorder unit DR1 is a part of the drive recorder unit DR1. It is preferred that the projecting portion OV1 and the projection corresponding portion OV2 are formed such that the width of the vacant space portion V1 between the projecting portion OV1 and the projection corresponding portion OV2 is almost the same as the width of the vacant space portion V1 between the mounting portion M1 (see the left illustration in FIG. 6) and the heat dissipation body 10 (see the left illustration in FIG. 6).

By the projecting portion OV1 and the projection corresponding portion OV2 being formed, the vacant space portion V1 can be said to be a vacant space the wind intake side of which is curved.

As shown in the left illustration in FIG. 6, when the mobile body travels, the wind becomes an air current in the negative z-axis direction. As shown in the left illustration in FIG. 6, since the projecting portion OV1 is formed, the wind taken into the vacant space portion V1 passes through the vacant space portion V1 along the bottom surface SL1 and then flows out to the outside of the driving assistance apparatus D1. Thus, in the driving assistance apparatus D1, by the projecting portion OV1 being formed, the wind accompanying travel of the mobile body certainly passes through the vacant space portion V1. Thereby, the driving assistance apparatus D1 can enhance dissipation of heat to the outside by the drive recorder unit DR1 and the mobile information terminal C1 and cooling thereof.

A tip part T1 of the projecting portion OV1 will be described with reference to the rightmost illustration in FIG. 6. As shown in the rightmost illustration in FIG. 6, the tip part T1 of the projecting portion OV1 is recessed from the bottom part 13L of the drive recorder unit DR1. In other words, as shown in the rightmost illustration in FIG. 6, a height h2 of the tip part T1 of the projecting portion OV1 in the z-axis direction is higher than a height h1 of the bottom part 13L of the drive recorder unit DR1 in the z-axis direction.

As shown in the rightmost illustration in FIG. 6, when the mobile body travels, the wind becomes an air current in the negative x-axis direction. As shown in the rightmost illustration in FIG. 6, since the tip part T1 of the projecting portion OV1 is recessed from the bottom part 13L of the drive recorder unit DR1, it is easy to take the wind into the vacant space portion V1.

The wind taken into the vacant space portion V1 passes through the vacant space portion V1 along a surface SL2 and flows out to the outside of the driving assistance apparatus D1. Thus, in the driving assistance apparatus D1, by the tip part T1 of the projecting portion OV1 being recessed from the bottom part 13L of the drive recorder unit DR1, it is possible to certainly take the wind accompanying travel of the mobile body into the vacant space portion V1, and the wind certainly passes through the vacant space portion V1. Thereby, the driving assistance apparatus D1 can enhance dissipation of heat to the outside by the drive recorder unit DR1 and the mobile information terminal C1 and cooling thereof.

As the z-axis direction of the mobile information terminal C1 or the housing unit H1 becomes closer to the same direction as the travel direction of the mobile body, that is, as the state becomes closer to the state of the left illustration in FIG. 6, it becomes easier to take in the wind by the tip part T1 of the projecting portion OV1.

FIG. 6 shows the example in which the tip part T1 of the projecting portion OV1 is recessed from the bottom part 13L of the drive recorder unit DR1 in order to make it easy to take the wind into the vacant space portion V1. The present disclosure, however, is not limited thereto, and a flap portion may be provided near the inflow side of the vacant space portion V1. The flap portion can change the direction of taking in the wind that flows into the vacant space portion V1 according to the attachment position (angle) of the mobile information terminal C1. Thereby, in the driving assistance apparatus D1, it becomes easier to take the wind into the vacant space portion V1. The flap portion is provided near the inflow side of the vacant space portion V1, for example, on the projecting portion OV1 or the projection corresponding portion OV2.

Outflow of Fluid

Figure 7:
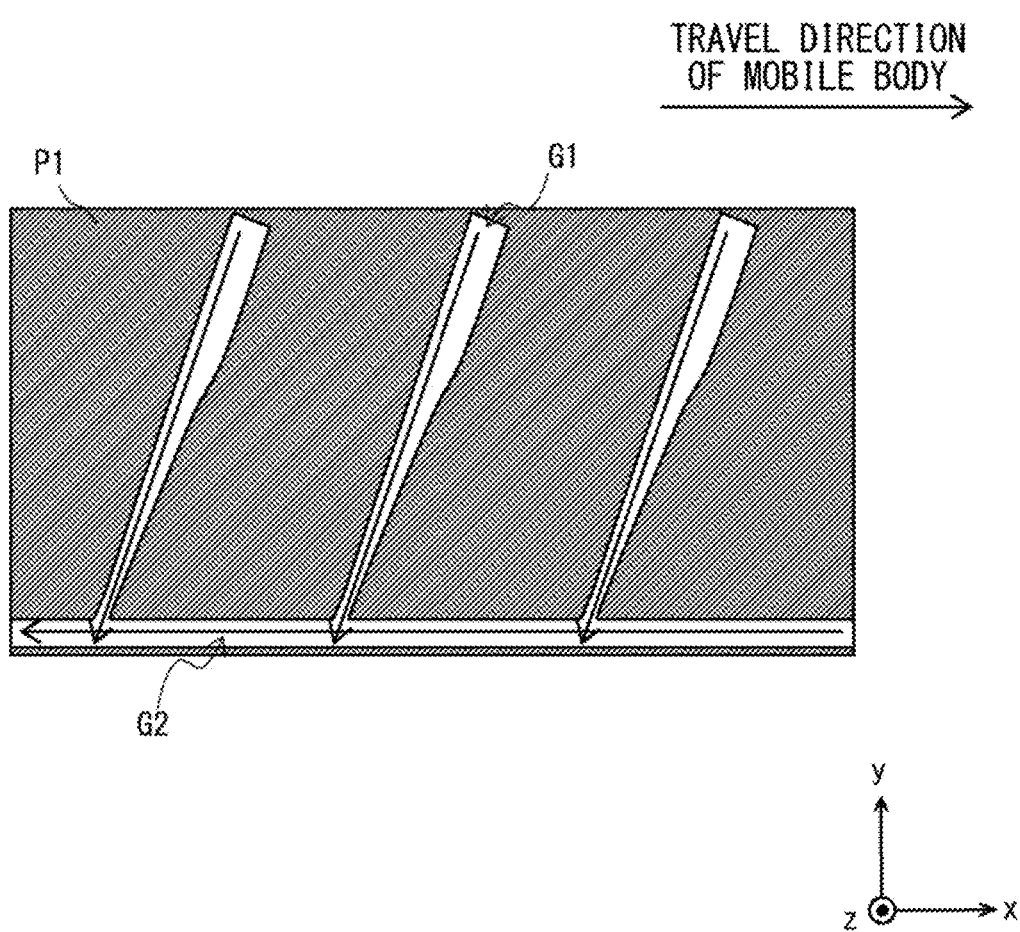
FIG. 7 is an xy plan view showing an example of a heat dissipation body.

Next, discharge of liquid from the driving assistance apparatus D1 will be described with reference to FIG. 7. FIG. 7 is an xy plan view showing an example of the heat dissipation body 10. In FIG. 7, the heat dissipation body 10 has a heat sink shape. More specifically, protrusions P1 and grooves G1 are alternately formed on the heat dissipation body 10 in the x-axis direction.

As described before, the driving assistance apparatus D1 is affected by the external environment. In the case of a bad weather day such as a rainy or snowy day, liquid (rain or melted snow) flows into the vacant space portion V1 (see FIGS. 1 to 3). FIG. 7 shows an example in which the liquid flows into the vacant space portion V1 (see FIGS. 1 to 3) from the right side.

As shown in FIG. 7, each groove G1 has a shape tapered from the positive y-axis direction to the negative y-axis direction. Each groove G1 may be provided with a slope in the negative y-axis direction so that the liquid easily flows. A groove G2 has a linear shape along the x-axis direction. The groove G2 is a groove provided on the edge of the heat dissipation body 10. Similarly to the grooves G1, the groove G2 may be provided with a slope in the negative x-axis direction so that the liquid easily flows. Or alternatively, the grooves G1 may be formed in the x-axis direction to be in the same direction as the travel direction of the mobile body. In this case, the groove G2 need not be provided. Due to the wind caused by travel of the mobile body, it becomes easy for the liquid accumulated in the grooves G1 to flow. It is also possible to apply coating of water-repellent material, for example, silicon resin material to the vacant space portion V1 side surface of the heat dissipation body 10 to promote flow of the liquid, without providing neither the grooves G1 nor the groove G2.

The liquid that has flowed into the vacant space portion V1 (see FIGS. 1 to 3) flows out to the groove G2 along the direction of arrows in FIG. 7 (the negative z-axis direction) via the grooves G1. The liquid that has flowed out to the groove G2 flows out to the outside of the driving assistance apparatus D1 along the direction of an arrow in FIG. 7 (the negative x-axis direction) via the groove G2.

Thus, the grooves G1 and G2 are grooves that can cause the liquid that has flowed into the vacant space portion V1 (see FIGS. 1 to 3) to flow outside. By adopting such a configuration, it is possible to prevent liquid from accumulating inside the driving assistance apparatus D1 even if the heat dissipation body 10 has a heat sink shape.

The present disclosure has been described above in accordance with the above embodiment. The present disclosure, however, is not limited only to the configuration of the above embodiment and, of course, includes various kinds of modifications, corrections, and combinations that can be made by one skilled in the art within the scope of the claims of the present application.

According to the present embodiment, it is possible to provide a driving assistance apparatus capable of preventing failure of a mobile information terminal caused by heat from a dashboard camera even if the mobile information terminal and the drive recorder unit are integrally arranged.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A driving assistance apparatus to be attached to a handlebar of a mobile body, the driving assistance apparatus comprising:
   a housing unit configured to hold a mobile information terminal; and
   a drive recorder unit configured to record surroundings of a driver of the mobile body, the drive recorder unit being provided on a back side of the housing unit when seen from a driver of the mobile body, with a curved vacant space portion, into which external wind is taken by travel of the mobile body, interposed therebetween, wherein heat from the drive recorder unit is dissipated outside from the vacant space portion.

2. The driving assistance apparatus according to claim 1, wherein the drive recorder unit is provided with a heat dissipation body on an interface with the vacant space portion.

3. The driving assistance apparatus according to claim 2, further comprising a Peltier device between the heat dissipation body and a circuit substrate of the drive recorder unit, the Peltier device comprising a heat absorption surface and a heat dissipation surface, wherein
   the heat absorption surface is arranged on a circuit substrate side of the drive recorder unit, and
   the heat dissipation surface is arranged on a heat dissipation body side.

4. The driving assistance apparatus according to claim 2, wherein a part of the housing unit projects to a drive recorder unit side.

5. The driving assistance apparatus according to claim 4, wherein a tip part of the part of the housing unit is recessed from a bottom part of the drive recorder unit.

* * * * *